(12) United States Patent
Vainio

(10) Patent No.: US 6,230,125 B1
(45) Date of Patent: May 8, 2001

(54) PROCESSING SPEECH CODING PARAMETERS IN A TELECOMMUNICATION SYSTEM

(75) Inventor: Janne Vainio, Sääksjärvi (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/894,676
(22) PCT Filed: Feb. 28, 1996
(86) PCT No.: PCT/FI96/00116
§ 371 Date: Jan. 5, 1998
§ 102(e) Date: Jan. 5, 1998
(87) PCT Pub. No.: WO96/27183
PCT Pub. Date: Sep. 6, 1996

(30) Foreign Application Priority Data

Feb. 28, 1995 (FI) ........................................ 950917

(51) Int. Cl.[7] ................................................... G10L 11/00
(52) U.S. Cl. ........................................................ 704/230
(58) Field of Search ................................. 704/200, 209, 704/230

(56) References Cited

U.S. PATENT DOCUMENTS 5,073,940  12/1991  Zinser et al. .
5,097,507   3/1992  Zinser et al. .
5,255,343  10/1993  Su .

FOREIGN PATENT DOCUMENTS

93/15502  8/1993  (WO) .
94/17472  8/1994  (WO) .
95/01682  1/1995  (WO) .

OTHER PUBLICATIONS

"European Digital Cellular Telecommunications System (Phase 2); Substitution and Muting of Lost Frames for Full Rate Speech Channels", GSM 06.11, Sep. 1994.
McArdle: "Coding for GSM", Electro Electronics, Jan. 1994, change 3.

Primary Examiner—Krista Zele
Assistant Examiner—Michael N. Opsasnick
(74) Attorney, Agent, or Firm—Pillsbury Madison & Sutro Intellectual Property

(57) ABSTRACT

The present invention relates to processing speech coding parameters in a telecommunication system. The speech coding parameters of a speech frame, produced by a speech encoder, are divided into groups, i.e. so-called virtual channels, in which speech parameter error correction, channel coding and processing of error-free or erroneous speech parameters are performed independently. At the receiving end, the processing (505) of erroneous and error-free speech parameters can thus be controlled independently on each virtual transmission channel (502) according to the quality of each virtual transmission channel. The speech parameters of the high-quality virtual channels of a speech frame can thus be processed as error-free, replacing the speech coding parameters of the low-quality virual channels only. The independently processed (505) speech parameters of the virtual channels are thus reassembled (507) into a speech frame, which is applied to decoding. Since part of the information of also erroneous speech frames is utilized, the use of speech information received from a transmission channel can be increased in speech decoding, which reduces for instance interruptions occurring in speech as compared with a situation where all speech frames erroneous even to a slight degree were discarded. The increased and more focused error indication also reduces the number of undetected errors and thus reduces significantly the worst audible disturbances.

11 Claims, 5 Drawing Sheets

PRIOR ART

PROCESSING SPEECH CODING PARAMETERS IN A TELECOMMUNICATION SYSTEM

FIELD OF THE INVENTION

The present invention relates to a method for processing speech coding parameters received over a transmission link in speech frames in a telecommunication system.

BACKGROUND OF THE INVENTION

In digital telecommunication systems supporting speech transmission, a speech signal is usually subjected to the following two coding operations: speech coding and channel coding.

Speech coding includes speech encoding carried out in a transmitter, performed by a speech encoder, and speech decoding carried out in a receiver, performed by a speech decoder. The speech encoder provided in the transmitter compresses a speech signal by employing a suitable speech coding method which takes into account the special characteristics of the speech in such a manner that the number of bits used for presenting the speech per time unit decreases, whereby the transmission capacity needed for transmitting the speech signal also decreases. The coded speech is presented in the form of speech coding parameters representing the characteristics of the speech. The speech signal transmitted over the transmission path consists of these speech coding parameters in special speech frames. The speech decoder provided in the receiver performs an inverse operation and synthesizes the speech signal on the basis of the speech coding parameters produced by the speech encoder. For instance the pan-European mobile communication system GSM (Global System for Mobile Communications) employs RPE-LTP (Regular Pulse Excitation—Long Term Prediction) speech coding, which utilizes both long and short term prediction. The coding produces LAR, RPE and LTP parameters for speech transmission.

In digital telecommunication systems which transmit speech, transmission errors occur on the transmission path, such errors deteriorating the quality of a speech signal in the receiver. Channel coding includes channel encoding carried out in the transmitter and channel decoding carried out in the receiver. The purpose of channel coding is to protect transmitted speech coding bits (parameters) from errors occurring on the transmission channel. By means of channel coding, it is possible either to merely detect whether speech coding bits have been subjected to errors during transmission without a possibility of correcting them, or channel coding may have a capability of correcting errors occurring during transmission, provided that there are fewer errors than a certain maximum number which depends on the channel coding method. The operation of channel coding is based on error check bits added among speech coding bits, such error check bit being also referred to as channel coding bits. Bits produced by the speech encoder of a transmitter are applied to a channel encoder, which adds a number of error check bits to the bits. For instance in the above-mentioned GSM full rate transmission channel, error coding bits the transmission speed of which is 9.8 kbit/s are added to speech coding bits of 13 kbit/s, the total transmission speed of the speech signal on the channel being thus 22.8 kbit/s. The channel decoder decodes the channel encoding in the receiver in such a manner that only the bit stream of 13 kbit/s produced by the speech encoder is applied to the speech decoder. In connection with the channel decoding, the channel decoder detects/corrects the errors occurred on the channel if it is possible.

The significance of speech coding bits as regards the quality of speech usually varies in such a manner that an error of one bit in an important speech coding parameter may cause an audible disturbance in synthesized voice, whereas a greater number of errors in less important bits may be almost imperceptible. The degree of differences in the importance of speech coding bits depends essentially on the speech coding method used, but at least minor differences can be found in most speech coding methods. Due to this, in developing a speech transmission method, channel coding is usually designed with speech coding in such a manner that those bits which are the most important, regarding the quality of speech, are protected better than less important bits. For instance in a full rate traffic channel of the GSM system, bits produced by a speech encoder are divided into three different classes with regard to their importance, the most important class being protected in channel coding both by an error-detecting and an error-correcting code, the second most important class being protected only by an error-correcting or an error-detecting code, and the least important class not being protected at all in channel coding.

In conventional telecommunication systems, erroneous speech frames are usually handled as entities, which means that if such errors are detected in a speech frame received from a transmission channel that channel decoding has not been capable of correcting, the entire speech frame is rejected and the error-free speech frame received last is used by attenuating or suitably extrapolating the speech coding parameters. For instance the GSM system employs one three-bit parity check code, on the basis of which the entire speech frame is classified as erroneous and the processing of erroneous speech frames is started.

FIG. 1 shows a schematic block diagram of a receiver of a telecommunication system transmitting a speech signal. A speech frame 100 received from a transmission channel is applied to a channel decoder 101. The channel decoder 101 provides speech coding parameters 102 according to the speech coding method used and an erroneousness indication 103 for each speech frame. The erroneousness indication 103 provides information concerning whether such an error has been detected in the received speech frame 100 that the channel decoding 101 has not been capable of correcting. The speech coding parameters are further applied to a block 104, in which the parameters are processed. The processing typically includes a system replacing the erroneous speech frames. The processed coding parameters 105 are applied to a speech decoder 106, which synthesizes a speech signal 107 on the basis thereof.

The applicant's previous patent application FI944345 (unpublished on the filing date of the present application) discloses a system according to the block diagram of FIG. 2 for processing coding parameters in the block 104 according to FIG. 1 between the channel decoding 101 and the speech decoding 106. Speech frames 401 arriving from the channel decoder are first analyzed in an error detection block 407. By means of the analysis of the block 407 and the error indications 400 obtained from the channel decoder, a speech frame is classified as erroneous or error-free in a block 410. The block 410 adjusts a switch 408 on the basis of this information, the switch deciding whether the processing block 406 of error-free frames or the replacement block 402 of erroneous frames is to be switched to an output 403. If a speech frame is found to be error-free, the switch 408 is adjusted to a state 2, in which the speech frame is applied as suitably processed via the block 406 to the output 403 and from there further to the speech decoder. If a speech frame is found to be erroneous, the block 410 adjusts the switch 408 to a state 1, the replacement block 402 thus providing the output 403 with the previous speech frame which was received as error-free, as suitably modified. Both the replacement block 402 of defective frames and the processing block 406 of error-free frames can be controlled, if required, according to the quality of the data link connection, defined in a block 409. A block 405 is a delay element, which contains the error-free speech frame received last, on the basis of which the block 402 performs the replacement. The control carried out by the block 406 may take place for instance by means of a state machine structure, of which the state structure according to the GSM specification 06.11 is an example.

An advantage of the present methods is their relative simplicity. Received speech frames are processed as units, and even if the replacement of erroneous speech parameters with error-free parameters and the processing of error-free speech coding parameters are controlled according to the quality of the data link connection, this is done jointly for all the speech coding parameters of a speech frame. Thus, only one replacement procedure is used, for instance one in accordance with the GSM specification 06.11, the replacement procedure controlling the processing of all speech coding parameters, without taking into account that channel coding usually protects different speech coding parameters to a different degree, whereby the distribution and frequency of errors contained by different speech coding parameters may vary. A speech frame may be interpreted as erroneous and replacement/attenuation of the speech coding parameters started if the speech frame contains even one error. The output of the speech decoder may thus be attenuated or silenced altogether only because single protected speech coding parameters are erroneous in a speech frame. However, part of the speech coding parameters of the speech frame may be error-free, the attenuation and replacement being thus also performed on such error-free speech parameters, i.e. they are performed too pessimistically, which causes interruptions in the speech signal and deterioration in the quality of speech. Also, in the processing of the speech coding parameters of error-free speech frames according to a state machine structure, it is possible that some parameters are attenuated too heavily on the basis of errors that have occurred in previous speech frames.

The used error checking information is also often defective or too ineffective. For instance the 3-bit parity check of the GSM system fails to detect many uncorrected transmission errors, which, on the basis of tests performed by the applicant, causes the most intense and unpleasant disturbances in the speech synthesized by the speech decoder.

SUMMARY OF THE INVENTION

The object of the invention is to process speech coding parameters by attempting to maximize, in speech coding, the amount of speech information obtained from the transmission channel and to minimize the effect of erroneous speech coding parameters, the effect of the transmission errors on the quality of - speech thus remaining as small as possible.

This is achieved with a method for processing speech coding parameters in a receiver of a telecommunication system, said method comprising the steps of receiving a coded speech signal via a transmission channel, said coded speech signal including speech frames containing speech coding parameters; channel decoding the speech signal, erroneous speech frames being detected and indicated in said channel decoding; processing parameters of the erroneous speech frames on the basis of the previous speech frame or speech frames; performing speech decoding on the speech frames. The method is characterized by dividing the speech coding parameters of a speech frame into groups of one or more speech coding parameters, said groups forming logical virtual transmission channels; determining the quality of each of said virtual transmission channels during a predetermined monitoring period which is longer than the duration of a speech frame; controlling the processing of error-free and erroneous speech coding parameters independently on each virtual transmission channel according to said determined quality of the virtual transmission channel.

The present invention also relates to a receiver for a speech signal, said speech signal including speech frames containing speech coding parameters, said receiver comprising a channel decoder, means for processing speech frames, and a speech decoder. The receiver is characterized in that the means for processing speech frames comprise a dividing means, which divides the speech coding parameters of a speech frame into N groups, each of which contains one or more speech coding parameters, $N=2, 3, \ldots$; N processing channels, each of which processes essentially independently one of said speech coding parameter groups on the basis of the quality of the speech coding parameters of said group and/or on the basis of error indications obtained from the channel decoder; an assembling means, which assembles the parameter groups processed separately from the parallel processing channels back into a speech frame, which is applied to the speech decoder.

The present invention also relates to a method for processing speech coding parameters in a telecommunication system, said method comprising the steps of encoding a speech signal by producing speech frames containing speech coding parameters; channel coding the speech frames and adding error check bits thereto, transmitting the speech frames via a data link connection to a receiving end; receiving the speech frames at the receiving end; channel decoding the speech signal, erroneous speech frames being detected and indicated in said channel decoding; processing parameters of the erroneous speech frames on the basis of the previous speech frame or speech frames; and performing speech decoding on the speech frames. The method is characterized in that A) the channel coding of the speech frames comprises the steps of a1) dividing the speech coding parameters of a speech frame into groups of one or more speech coding parameters, said groups forming logical virtual transmission channels; a2) performing error-indicating coding independently on each virtual transmission channel; B) the processing of the speech frames at the receiving end comprises the steps of b1) determining the quality of each virtual transmission channel independently on the basis of the error-indicating coding, b2) controlling the processing of error-free and erroneous speech coding parameters independently on each virtual transmission channel according to the determined quality of the virtual transmission channel.

The present invention also relates to a telecommunication system, in which a transmitter comprises a speech encoder, which produces speech frames containing speech coding parameters, and a channel encoder, and a receiver comprises a channel decoder, means for processing speech frames, and a speech decoder. The system is characterized in that the transmitter comprises a coding unit, which divides the speech coding parameters of a speech frame into N virtual channels, each of which contains one or more speech coding parameters, and performs error-indicating coding independently on each virtual channel, said means for processing speech frames in a receiver further comprising N processing channels, each of which processes essentially independently the speech coding parameters of one of said virtual transmission channels according to the quality of the respective virtual transmission channel, said quality being determined on the basis of error indications generated by the error indication coding of the virtual channel concerned in a predetermined number of speech frames, and an assembling means, which assembles the processed parameter groups from the N parallel processing channels back into a speech frame, which is applied to a speech decoder.

The basic idea of the invention is that a transmission channel and speech frames transmitted thereto and received therefrom are not processed as one unit, but the speech coding parameters of a speech frame are divided into groups, in each of which the processing of error-free speech coding parameters or the use of erroneous speech frames is controlled independently. This is based on the fact that usually, speech coding parameters transmitted on a transmission channel are protected according to their importance, error distributions and frequencies in better protected speech coding parameters thus differing from poorer protected parameters. Transmission errors are not distributed evenly in the bits of a speech frame, either. Thus, it is conceivable that instead of an actual physical transmission channel, each group of parameters or even a single speech coding parameter provides an individual logical "sub-channel" or a "virtual channel" within the physical transmission channel, such a virtual channel having different characteristics than the other virtual channels. Thus, on each virtual transmission channel, the processing of error-free parameters or the use of erroneous speech frames can also be controlled independently according to the quality of each virtual transmission channel. The processing of the speech coding parameters of a better virtual transmission channel does not thus have to be controlled according to the quality of the poorest virtual transmission channel, but the replacement procedure can take into account the better protection of the virtual transmission channel concerned or the fact that errors have not occurred in the area of said virtual channel in the speech frame to be processed. Due to this, the speech parameters of good-quality virtual channels of a speech frame which is classified as entirely erroneous in conventional systems can be processed as error-free, by replacing only the speech coding parameters of poor-quality virtual channels. It is thus possible to also utilize part of the information of erroneous speech frames, whereby the use of speech information received from a transmission channel in speech decoding can be increased, which reduces for instance interruptions occurring in speech as compared with a situation where all speech frames erroneous even to a slight degree were discarded. The increased and more focused error indication also reduces the number of undetected errors and thus reduces significantly the worst audible disturbances.

In the invention, the quality of a physical transmission channel, and also that of a virtual transmission channel, is determined by monitoring the quality of received speech coding parameters on the channel concerned during a predetermined monitoring period, which is longer than the duration of the speech frame, preferably a plurality of speech frames. The quality of the transmission channel may be determined as a cumulative function of reliability indications calculated from speech coding parameters received during a monitoring period and those obtained from the channel decoder. The simplest way is to calculate the cumulative distribution of error-free and erroneous speech parameter groups.

In the preferred embodiment of the invention, the quality of each virtual channel is also affected by an estimate of the quality of the entire received speech frame, i.e. the quality of the entire physical transmission channel, and by an estimate of the quality of the other speech coding parameters or parameter groups, i.e. the quality of the other virtual channels, on which the speech coding parameter processed at a given moment is dependent for instance due to a performed speech decoding operation.

In the present invention, a complete or partial replacement of a speech frame thus takes place in several independent parts of the speech frame, these parts being able, however, to utilize information on the operation of the other parts, if required. Part of an erroneous speech frame can thus be used if the quality of the respective virtual channel as determined over said predetermined period is sufficiently good. On the other hand, part of a single entirely error-free speech frame may be discarded if the quality of the respective virtual channel during the monitoring period is sufficiently poor within the used monitoring period. If 50 speech frames, for instance, have been erroneous frames, one error-free speech frame is insignificant in view of the quality of the speech. As a result, the present invention allows processing of speech signal over longer time periods which are more significant to the quality and intelligibility of the speech than a single speech frame. Use of a single speech frame may cause rapid changes in the speech and thereby decrease the quality of the speech. The invention aims at obtaining as accurate information as possible on the quality of each speech coding parameter, it being thus possible to maximize the amount of speech information obtained from a transmission channel and to minimize the effect of erroneous speech coding parameters, the effect of transmission errors on the quality of a decoded speech signal thus remaining small. The number of audible intensive disturbances is reduced when more accurate indication is obtained of an error and the processing of parameters can be focused on certain parameters only, whereby speech parameters are not attenuated too strongly on a transmission channel on which disturbances occur.

BRIEF DESCRIPTION OF THE FIGURES

In the following, the invention will be described in more detail by means of the preferred embodiments of the invention with reference to the accompanying drawing, in which.

THE DETAILED DESCRIPTION OF PREFERRED EMBODIMENTS OF THE INVENTION

The speech coding parameter processing according to the present invention can be applied in any digital telecommunication system in which a digital speech signal is transmitted, this signal being coded at the transmitting end by any suitable speech coding method into a form of speech coding parameters in order to be transmitted over a transmission path, and decoded at a receiver by means of the transmitted speech coding parameters into a synthesized speech signal.

Figure 1:
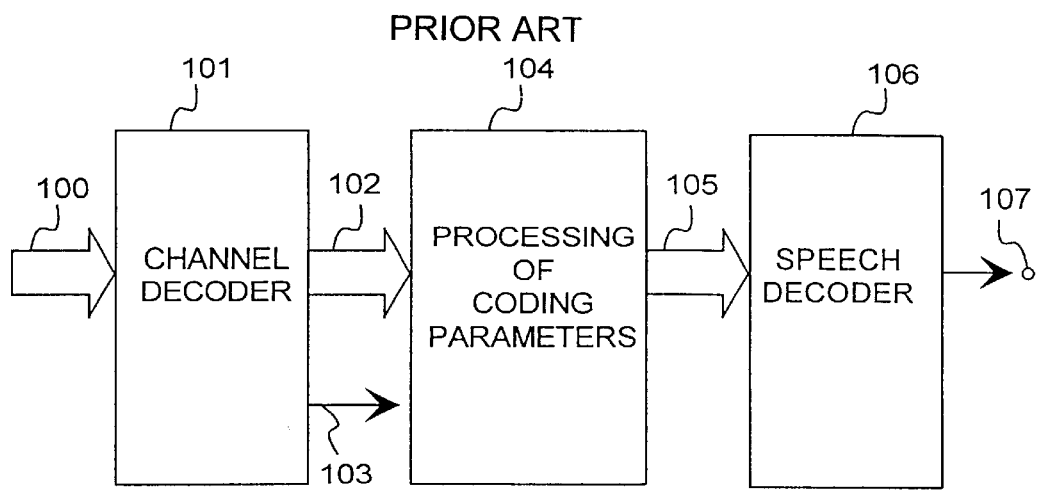
FIG. 1 is a schematic block diagram of a receiver in a telecommunication system transmitting a speech signal.

The invention can be used for instance, in the telecommunication system receiving parts according to FIG. 1, these parts including processing of speech coding parameters before they are applied to a speech decoder 106, based on speech coding parameter error indications obtained from the channel decoder or deduced in some other manner. The invention thus comprises a method for improving the speech coding parameter processing block 104 of FIG. 1. With regard to optimizing the performance of the entire system, it is usually preferable to also modify the channel decoder 101 and the speech decoder 106 to adapt them to the operation of the processing block 104 according to the invention. On demand, the present invention can be applied in the processing block 104 without changing the structure and operation of the channel decoder 101 and the speech decoder 106, however.

With regard to the invention, there is no significance as to what speech coding method the speech decoder 106 employs, since the invention is based on processing speech coding parameters contained by a speech frame separately or in small groups. These groups can be determined speech coding method-specifically in a manner which is the most appropriate in each particular case, the used speech coding method thus having no effect on the basic idea of the invention. Therefore, there is no need to describe any particular speech coding method in the present application. As an example of a known method, the RPE-LTP method of the GSM mobile communication system is mentioned, however. The exact structure of transmission frames used for transmitting speech coding parameters, i.e. of speech frames, is not essential with regard to the invention. The exact structure of speech frames may vary freely depending on the telecommunication system and the transmission link, and no particular speech frame structure will be described in more detail in this context. However, as an example of a known speech frame, the TRAU frame of the GSM mobile communication system is mentioned, the use of such a frame in speech transmission being discussed in the GSM specification 08.60.

The channel decoder 101 must be provided with some type of error detecting and correcting procedure, by means of which erroneous speech frames are detected, if possible. If the channel decoder 101 or some other part at the receiver does not provide sufficiently accurate error indications for establishing the parameter-specific virtual channels of the invention, the virtual channels can be formed from parameter groups consisting of several parameters, or error indications can be deduced on the basis of the distribution and mutual relations of the speech coding parameters, i.e. by utilizing the characteristics of speech. One characteristic of speech is that all possible combinations of speech coding parameters do not necessarily occur in error-free speech frames.

With regard to the invention, it is preferable that in a telecommunication system, individual error check indication can be transmitted for each speech coding parameter or parameter group constituting a virtual channel. The deduction can also be carried out parameter-specifically without a transmitted error check indication for instance from received soft decision values. This signifies a greater number of transmitted error check indications, the transmission speed used for these indications thus also increasing. In a telecommunication system, it must thus be possible to use a relatively large proportion of the transmission channel capacity for transmitting error check information. Additional capacity for this purpose is obtained for instance when a new, more developed speech coding method is arranged in the place of or along with a previous speech coding method in an existing telecommunication system, the new method operating at lower transmission rate. An example of such a modification in a telecommunication system is disclosed in the applicant's previous Finnish Patent Application 943302.

In connection with the preferred embodiment of the invention, described in FIGS. 3 and 4 below, it is assumed, however, that indication of the erroneousness/faultlessness of parameter groups, deduced on the basis of the error correction coding used by the telecommunication system or by some other means, is obtained from the channel decoder or some-other part of the receiver. Such indication may be for instance the BFI (Bad Frame Indication) according to the GSM. Error detection and identification of erroneous frames are discussed in the GSM specification 05.03 (Channel Coding).

Figure 3:
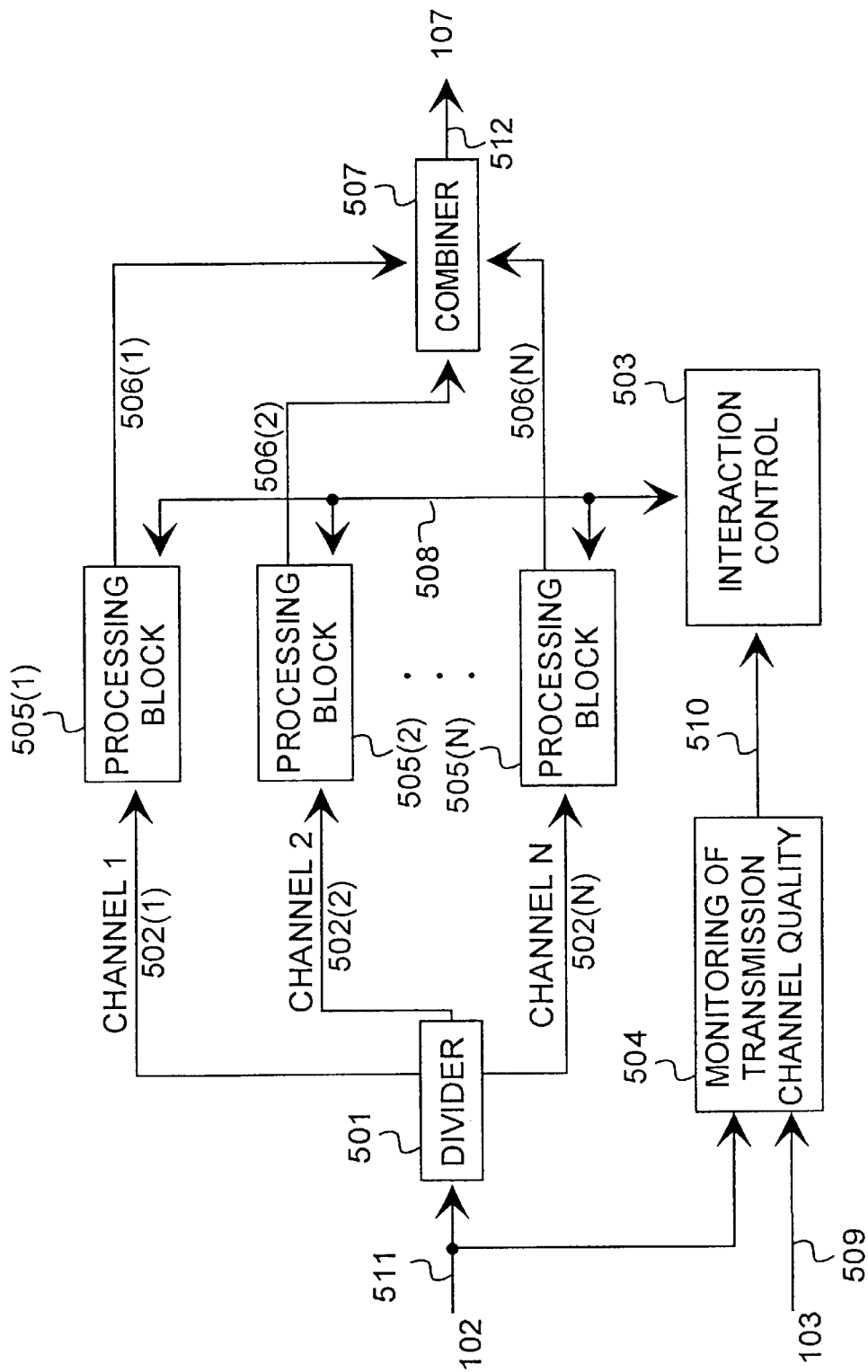
FIG. 3 is a block diagram of the speech coding parameter processing according to the invention.

In FIG. 3, the processing unit 104 comprises an input 511, at which is received a speech frame 102 from the channel decoder 101. A dividing means 501 divides the speech frame into virtual channels 502 (1) . . . 502 (N) consisting of single speech coding parameters or groups thereof. Each virtual channel 502 (1) . . . 502 (N) is provided with a dedicated independent processing and replacement procedure block 505 (1) . . . 505 (N), to which the speech coding parameter or parameters of the virtual channel are applied. The speech coding parameters 506 (1) . . . 506 (N) processed in the blocks 505 (1) . . . 505 (N) are reassembled in an assembling means 507 into a speech frame 107, which is applied via an output 512 to the speech decoder 106 (FIG. 1). The transmission link monitoring block 504 monitors the quality of the speech coding parameters by means of error indications calculated from the speech frames 102 and error indications 103 received at an input 509 from the channel decoder 101. These error indications 103 may also include virtual channel-specific error indications, which will be described in more detail below. The estimate 510 of the value of the speech coding parameters, established in this manner, is applied to a block 503 controlling the interaction of the processing and replacement procedures 505, the block 503 controlling the blocks 505 (1) . . . 505 (N) via a control bus 508. The bus 508 may include several signals, which can be used for controlling each block 505 separately, if required, and for transmitting information, such as error indications, to each block. The control block 503 also ensures that the functions of the processing and replacement blocks of different virtual channels are coordinated in a sensible manner. This coordination depends on the used speech coding method and the interdependence of its speech coding parameters. This coordination may comprise for instance the fact that when the block 504 defines the quality of the transmission link to be very poor, the control block 503 adjusts in a centralized manner all the processing and replacement blocks 505 (1) . . . 505 (N) to attenuate the speech parameters regardless of the values of single speech coding parameters. The quality of the transmission channel may be determined for instance as a cumulative function of reliability indications calculated from speech coding parameters 102 received during a predetermined period and those obtained from the channel decoder 101. At its simplest, the quality of the transmission channel can be determined as a cumulative distribution of error-free and erroneous speech frames, for instance merely on the basis of the signal 103.

Figure 4:
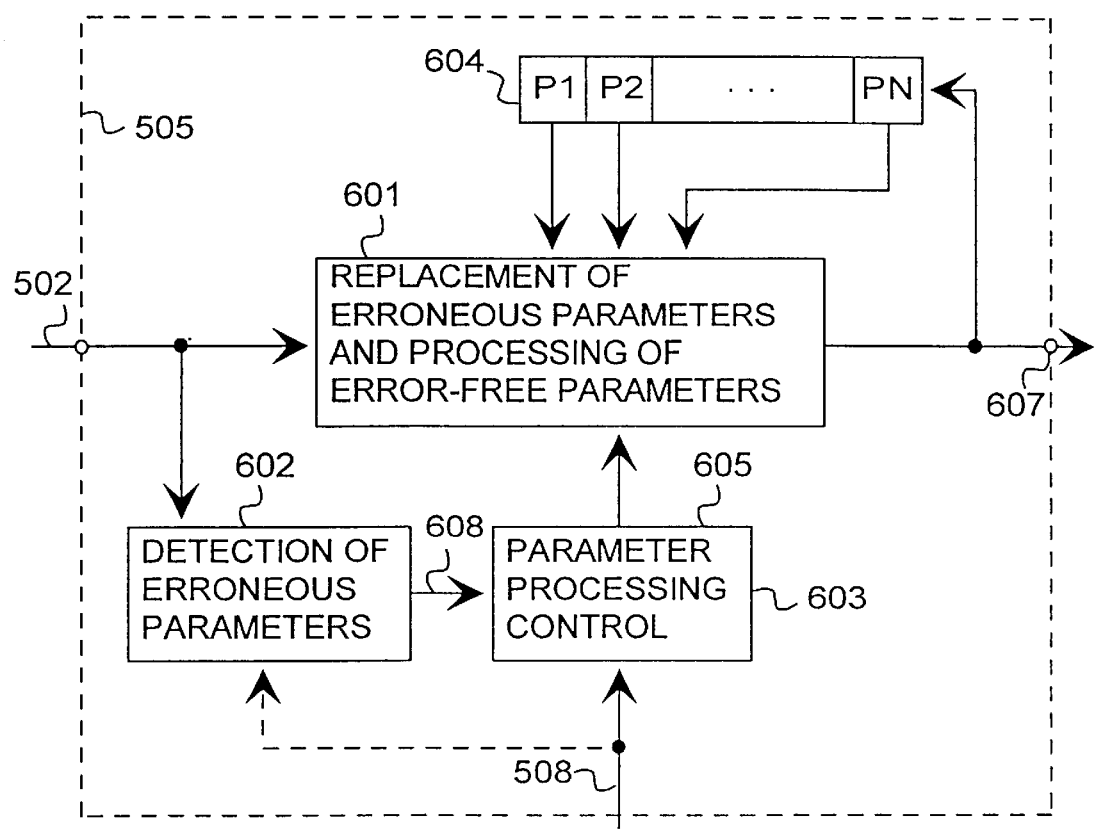
FIG. 4 is an example of the operation of the processing block 505 of FIG. 3.

The block diagram of FIG. 4 shows one way of implementing the processing and replacement blocks 505 of FIG. 3. The single speech coding parameter or the speech coding parameter group applied by the dividing means 501 to a virtual channel 502 is applied to a processing block 601 and to an erroneous parameter detection block 602. The processing block 601 performs the processing of both erroneous and error-free parameters. The operation of the processing block 601 is controlled by a signal 605 obtained from a control block 603, this signal indicating the erroneousness of a speech coding parameter or speech coding parameter group. The speech coding parameters 506 processed by the processing block 601 are applied via the output 607 of the block 505 to the combining block 507 (FIG. 4). In addition, the processed speech coding parameters are fedback from the output 607 to a buffer 604 of previously used speech coding parameters, this buffer containing the processed speech coding parameters P1, P2, ..., PN of N previous speech frames of the virtual channel. The buffer memory 604 is connected to the processing block 601 in order to use the stored speech coding parameters P1, P2, ..., PN in the processing and replacement procedure of erroneous speech coding parameters. Depending on the control signal 605, the processing block 601 either processes the error-free parameters or replaces the erroneous parameters with parameters obtained from the buffer memory 604. At its simplest, the processing of error-free parameters means that speech coding parameters received from the virtual channel 502 are transmitted as such via the output 607 to the assembling means 507. This usually takes place when the signal 508 indicates that the quality of the data link connection is high. The processing and replacement of erroneous speech coding parameters can be carried out with any suitable processing and replacement procedure, for instance by replacing the erroneous speech coding parameters of a speech frame with the average of the speech coding parameters P1, P2, ..., PN of N previous speech frames, stored in the buffer memory 604. If the quality of the virtual channel is low, the erroneous frame n may not be replaced with the previous error-free frame n−1, but the change in the parameter values from frame n−1 to frame n will be filtered, e.g. by equation f(n)−0.5*f(n−1)+0.5*a(n), wherein f( ) and a( ) are the output and input of the correction algorithm. In attenuating and replacing speech coding parameters, for instance the procedure described in the GSM specification 06.11 (Substitution and Muting of Lost Frames for Full-Rate Speech Traffic Channels) can also be applied.

The detection block 602 may also deduce error indications on the basis of the distribution and mutual relations of received speech coding parameters. The characteristics of speech are thus utilized, for instance the fact that all possible combinations and values of speech coding parameters do not necessarily occur in error-free speech frames. For instance, permissible combinations or values may be defined for speech coding parameters, speech coding parameters deviating from these combinations or values being defined as erroneous in the detection block 602, the detection block 602 thus providing error indication 608. Alternatively, it is possible to define for instance forbidden combinations and values for speech coding parameters, speech coding parameters matching these combinations or values causing the error indication 608. Criteria used for detecting erroneous speech coding parameters may also vary with the quality of the transmission channel, notification of which is obtained for instance in the form of the signal 508. In the detection block 602, for instance the detection procedure described in the applicant's previous Finnish Patent Application 944345 can be applied, with the difference, however, that now error indication is provided for single speech coding parameters or groups thereof, and not for an entire speech frame. The detection block 602 may also obtain error indication, this error indication notifying of an error existing in the speech coding parameters of the virtual channel concerned, from the channel decoder 101 or some other part of the receiver.

Figure 2:
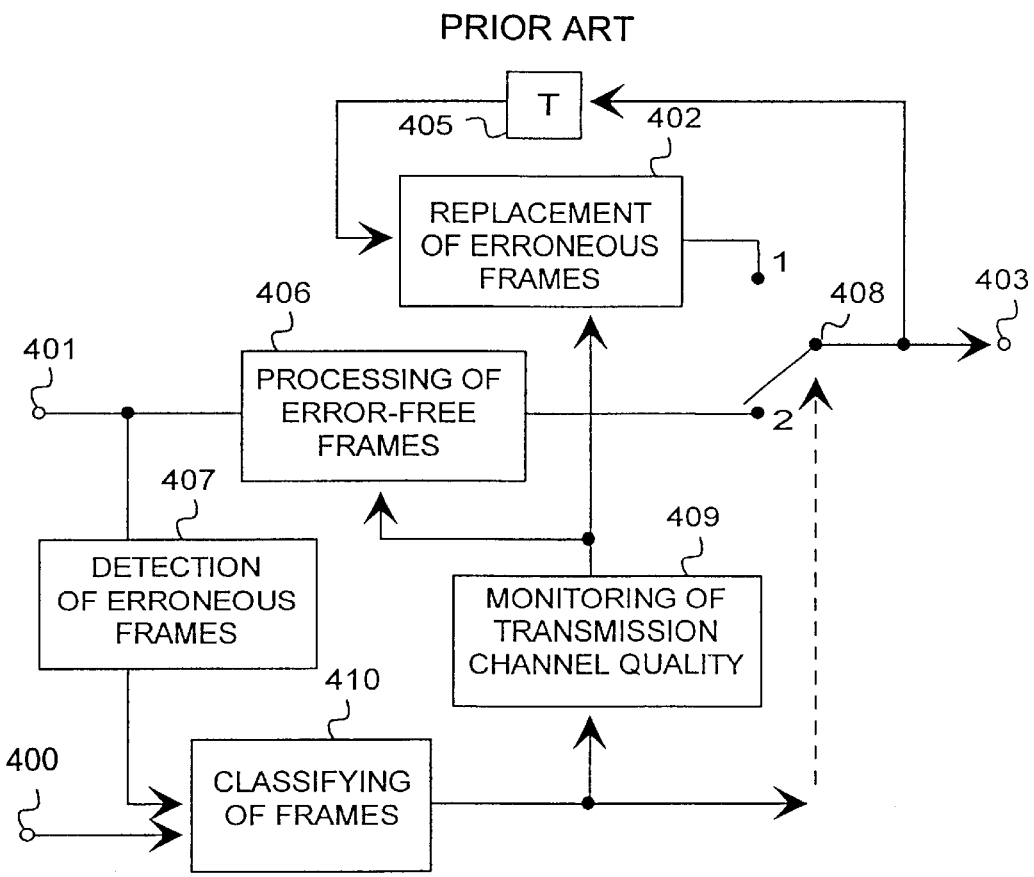
FIG. 2 is a block diagram of a prior art coding parameter processing unit.

The control block 603 may include for instance a state machine according to the GSM specification 06.11, this state machine controlling the processing of speech coding parameters taking place in the block 601 on the basis of the error indication 608 obtained from the detection block 602. In addition, the operation of the control block 603 is affected by the virtual channel interaction control signal 508, which is obtained from the control block 503 of FIG. 3. The control signal 508 consists of error indications obtained from the actual channel decoder and of information on the operation and statuses of the other virtual channels 502. Each virtual channel is thus provided with a dedicated state machine structure making independent decisions. This means that even if erroneous speech coding parameters were detected and a replacement procedure of erroneous speech coding parameters were followed in one virtual channel 502, the other virtual channels 502 may still perform processing of error-free speech coding parameters, i.e. for instance in state 0 of the state machine structure of FIG. 3. The speech coding parameter processing according to the invention thus changes the speech coding parameters of this one virtual channel only and transmits the speech coding parameters of the other virtual channels unchanged further to the assembling means 507. The speech decoding can thus use as much as possible of the speech information provided in the original speech frame, which reduces the number of disturbances and interruptions in the speech signal and improves the quality of audible speech as compared with a situation where entire speech frames were discarded. In addition, since part of the speech coding parameters of an erroneous speech frame can also be utilized in the above-described manner, for instance the switch 408 according to FIG. 2 is not required, since in the processing block 505 of each virtual channel, a speech coding parameter applied to the output 607 is always stored in the buffer memory 604, regardless of whether it originates from an erroneous or an error-free speech frame.

Figure 5:
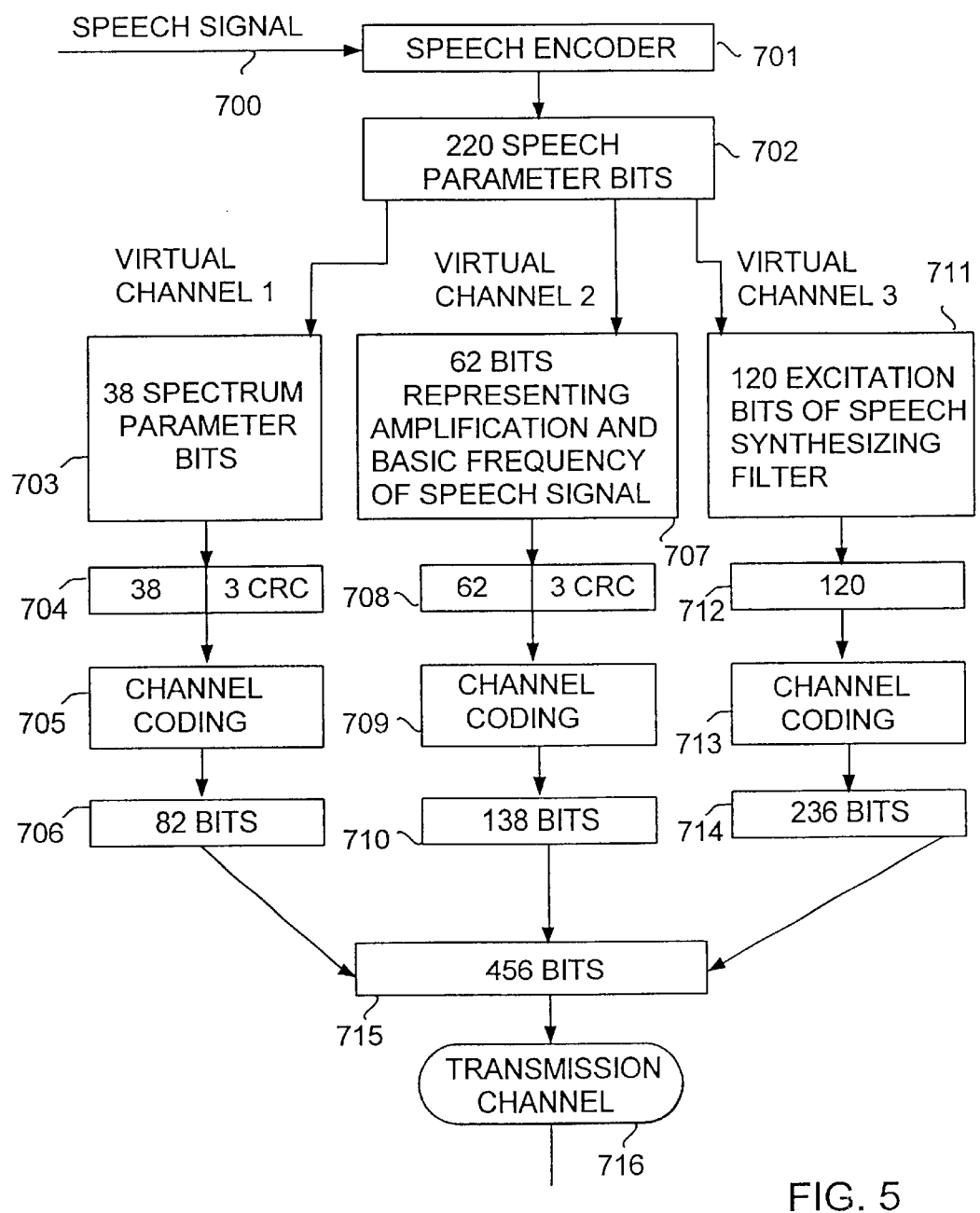
FIG. 5 illustrates the principal features of a transmitter.

FIG. 5 shows a transmitter which produces virtual channel-specific error indications in speech frames. A speech signal 700 is applied to a speech encoder 701, which produces a speech frame according to a GSM system full rate traffic channel, this speech frame containing 220 speech coding parameter bits instead of 260 bits, however, due to the more developed speech coding method of the encoder 701. A divider 702 divides the speech coding parameters to three virtual transmission channels 1, 2 and 3 in the following manner:

38 spectrum parameter bits to channel 1 (block 703),
62 bits representing the amplification and the basic frequency of the speech signal to channel 2 (block 707),
120 excitation bits of a speech synthesizing filter to channel 3 (block 711).

In each of these three virtual transmission channels 1, 2 and 3, error check bits are added independently to the speech parameter bits in error coding blocks 704, 708 and 712, respectively, and channel coding is performed independently in channel encoders 705, 709 and 713, respectively.

The two most important virtual channels 1 and 2 are each provided with a 3-bit CRC parity check code (CRC). No error check bits are added to virtual channel 3.

After the channel coding, the virtual channels 1, 2 and 3 produce 82, 138 and 236 bits, respectively (blocks 706, 710 and 714), which are combined into one 456-bit speech frame (block 715), which is transmitted to a transmission channel 716.

Figure 6:
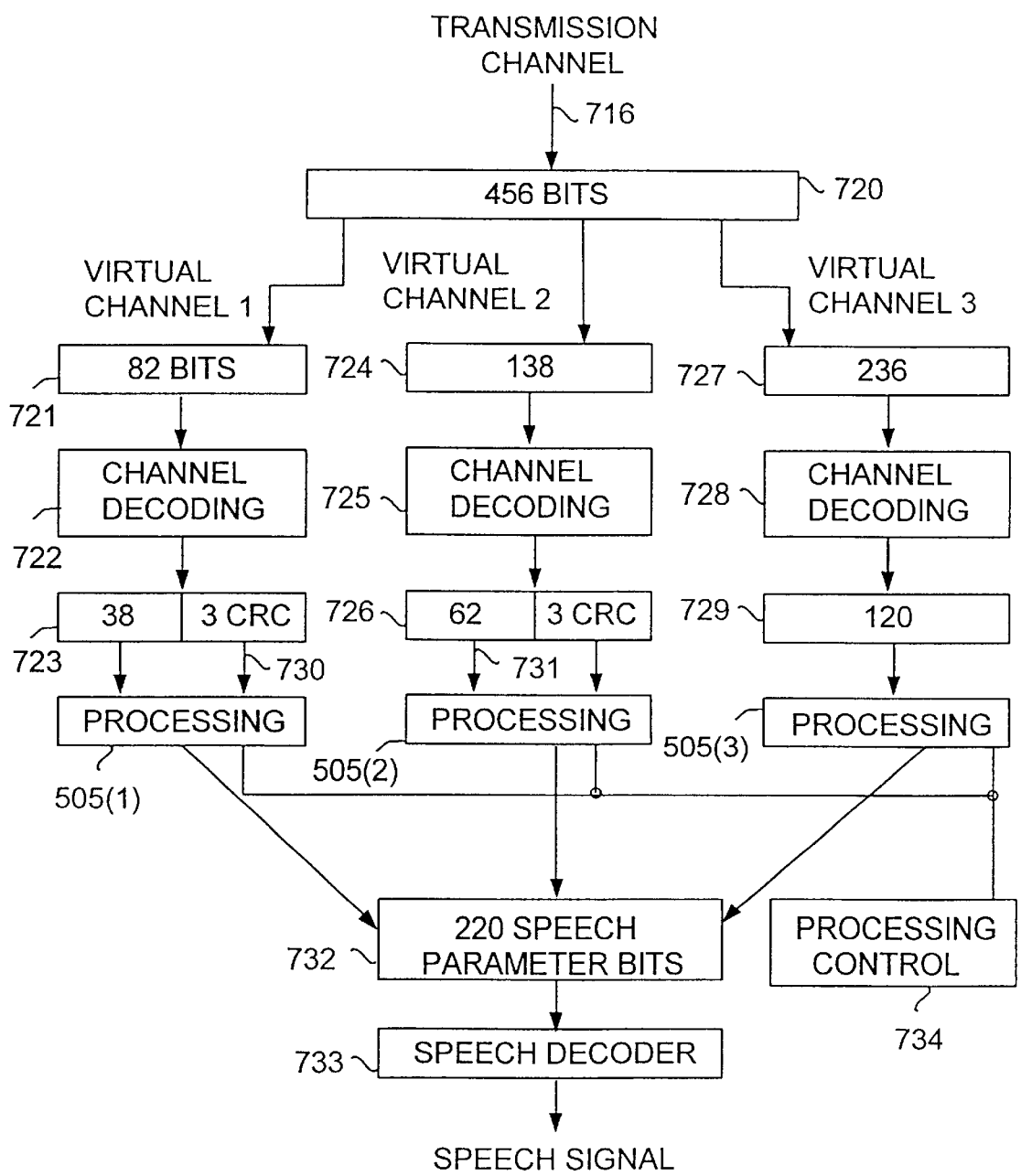
FIG. 6 illustrates the principal features of a receiver.

FIG. 6 shows the principal features of a receiver suited for receiving the speech frame produced by the transmitter of FIG. 5. The 456-bit speech frame is received from the transmission channel 716 at a divider 720, which divides the channel coded speech coding bits of the virtual channels 1, 2 and 3 to corresponding virtual channels, i.e. 82 bits to channel 1 (block 721), 138 bits to channel 2 (block 724), and 236 bits to channel 3 (block 727). On each channel, channel decoding is performed independently in channel decoders 722, 725 and 728, respectively, and CRC parity check in checking blocks 723, 726 and 729, respectively. Thereafter, the speech parameter bits are applied to processing blocks 505 (1), 505 (2) and 505 (3), which process error-free and erroneous speech coding parameters independently for each virtual channel. Error indication 730 or 731 is also applied to the processing blocks if the block 723 or 726 detects that the parameters of the virtual channel contain errors that it is not capable of correcting. The blocks 505 are similar as for instance the block 505 in FIG. 4. The speech parameters processed by the blocks 505 are applied to an assembler 732, which provides a speech frame containing 220 speech coding bits, this speech frame being applied to a speech decoder 733. The blocks 505 may be provided with a control unit 734 coordinating the interaction thereof, this control unit being similar to the control block 503 in FIG. 3.

Even if the invention has been described with reference to certain embodiments, it will be apparent that the description is only given by way of an example, and it can be changed and modified without deviating from the spirit and scope of the invention defined by the appended claims.

What is claimed is:

1. A method for processing speech coding parameters in a receiver of a telecommunication system, said method comprising:
   receiving a coded speech signal via a transmission channel, said coded speech signal including a plurality of speech frames having speech coding parameters;
   channel decoding the speech the signal, erroneous ones of the speech frames being detected and indicated in said channel decoding;
   processing the speech coding parameters of the erroneous ones of the speech frames based on at least one previous speech frame;
   dividing the speech coding parameters of a speech frame into groups of at least one speech coding parameter, said groups forming a plurality of logical virtual transmission channels;
   determining a quality of each of said virtual transmission channels during a predetermined monitoring period which is longer than a duration of a speech frame;
   controlling processing of error-free and erroneous speech coding parameters independently on each of the virtual transmission channels according to said determined quality of a respective virtual transmission channel; and
   performing speech decoding on the speech frames.

2. A method according to claim 1, further comprising:
   detecting errors independently on each of the virtual transmission channels;
   processing the speech coding parameters independently on each of the virtual transmission channels having errors by using corresponding speech coding parameters of the at least one previous speech frame;
   reassembling the separately processed speech coding parameters into a speech frame, wherein
   said speech decoding decodes the assembled speech frame.

3. A method according to claim 1 or 2, wherein said determining of the quality of a virtual transmission channel is performed by monitoring a quality of the received speech coding parameters during the predetermined monitoring period.

4. A method according to claim 3, wherein the quality of the speech coding parameters is determined as a cumulative function of reliability indications calculated from the speech coding parameters received during the predetermined period and the speech coding parameters obtained from the channel decoding.

5. A method according to claim 4, further comprising calculating a cumulative distribution of the speech frames having errors and the speech frames without errors.

6. A method according to claim 1, wherein said determining determines the quality of a virtual transmission channel based on an error indication concerning the speech coding parameters of the virtual channel, said error indication being obtained from the channel decoding.

7. A receiver for a speech signal, said speech signal including speech frames having plurality of speech coding parameters, said receiver comprising:
   a channel decoder,
   a speech coding parameter processing portion; and
   a speech decoder, wherein:
      the speech coding parameter processing portion comprises:
         a divider, which divides the speech coding parameters of a speech frame into N groups, each of which contains at least one speech coding parameters, and N being at least two;
         a monitor;
         N parallel processing channels; and
         an assembler, wherein:
            said monitor determines a quality of an entire transmission channel during a predetermined monitoring period, said predetermined monitoring period being longer than a duration of a speech frame, and
            each of said N processing channels processes, independently, said respective one of said N groups based on at least one of said determined quality of the transmission channel and error indications obtained from the channel decoder, and
            said assembler assembles the parameter groups processed separately from the parallel processing channels back into a speech frame, the speech frame being applied to the speech decoder.

8. A receiver according to claim 7, wherein each of the processing channels comprises:
   a detector to detect erroneous speech coding parameters,
   a memory, in which are stored corresponding speech coding parameters of at least one previous speech frame, and
   a processing and replacement unit, in which the speech coding parameters identified as erroneous are replaced with parameters which are formed based on the speech coding parameters stored in said memory.

9. A receiver according to claim 7 or 8, wherein the speech coding parameter portion further comprises:
   a control unit, which controls an interaction of the processing channels depending on the determined quality of the transmission channel.

10. A method for processing speech coding parameters in a telecommunication system, said method comprising:

encoding a speech signal by producing a plurality of speech frames having a plurality of speech coding parameters;

channel coding the speech frames and adding error check bits thereto, transmitting the speech frames via a data link connection to a receiving end;

receiving the speech frames at the receiving end;

channel decoding the speech signal, erroneous ones of the speech frames being detected and indicated in said channel decoding;

processing parameters of the erroneous ones of the speech frames based on at least one previous speech frame; and performing speech decoding on the speech frames, wherein:

the channel decoding of the speech frames comprises:

dividing the speech coding parameters of a speech frame into groups of at least one speech coding parameter, said groups forming logic virtual transmission channels, and performing error-indicating coding, independently, on each of the virtual transmission channels; and processing of the speech frames at the receiving end comprising:

determining, during a predetermined period being longer than a duration of a speech frame, a quality of each of the virtual transmission channels, independently, based on the error-indicating coding, controlling processing of error-free and erroneous speech coding parameters, independently, on each of the virtual transmission channels according to the determined quality of the respective virtual transmission channel.

11. A telecommunication system comprising:

a transmitter comprising:

a speech encoder, which produces a plurality of speech frames having a plurality of speech coding parameters, a channel encoder, and a coding unit which divides speech coding parameters of a speech frame into N virtual channels, N being at least two, each of the virtual channels having at least one speech coding parameter and performing error indicating coding, independently, on each of the virtual channels; and a receiver comprising:

a channel decoder, a speech coding parameter processing portion further comprising:

a monitor to determine a quality of an entire transmission channel during a predetermined monitoring period, said predetermined monitoring period being longer than a duration of a speech frame, and N processing channels, each of which processes, independently, the speech coding parameters of one of the virtual transmission channels according to at least one of the determined quality of the transmission channel, and a quality being determined based on error indications generated by the error indicating coding of the virtual channel concerned in a predetermined number of speech frames, a speech decoder, and an assembler to assemble the processed speech coding parameters from the N virtual channels back into a speech frame, which is applied to a speech decoder.

* * * * *